Figure 8:
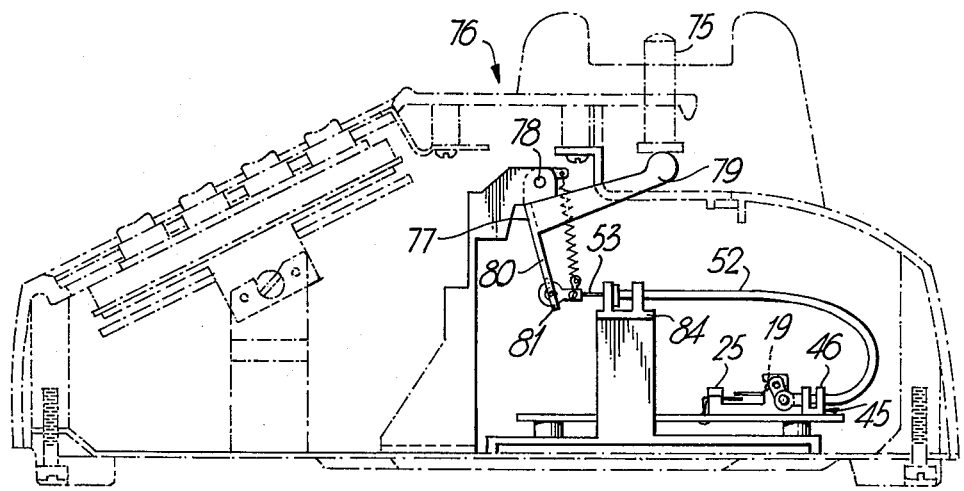

United States Patent [19]

Chu et al.

[11] 4,091,244

[45] May 23, 1978

[54] MULTIPLE CONTACT SWITCH

[75] Inventors: Pak-Jong Chu; Jacques Marcel Audette, both of Ottawa, Canada

[73] Assignee: Northern Telecom Limited, Montreal, Canada

[21] Appl. No.: 810,525

[22] Filed: Jun. 27, 1977

[51] Int. Cl.² .............................................. H04M 1/08
[52] U.S. Cl. .............................. 179/158 R; 179/165; 200/6 BB
[58] Field of Search .............. 179/158, 159, 163, 164; 200/153 LB, 153 LA, 153 L, 6 B, 6 BB

[56] References Cited

U.S. PATENT DOCUMENTS

| 1,169,957 | 2/1916 | Henry | 200/6 BB |
| 2,101,271 | 12/1937 | Schreiber | 179/158 |

*Primary Examiner*—William C. Cooper
*Attorney, Agent, or Firm*—Sidney T. Jelly

[57] ABSTRACT

A multiple contact switch has a plurality of contact areas spaced across a base member, a plurality of cantilevered spring contact members mounted side-by-side on the base member with contact portions overlying the contact areas, and a rotary cam member extending over the spring contact members to push the contact members down to make contact. A cam surface is provided for each contact member. The cam member is actuated by a remove actuating member and in a line switch for a telephone set, the switch can be mounted on the base of the telephone set with the cam actuated by a flexible cable which in turn is actuated by means depressed when a hand set is replaced.

7 Claims, 9 Drawing Figures

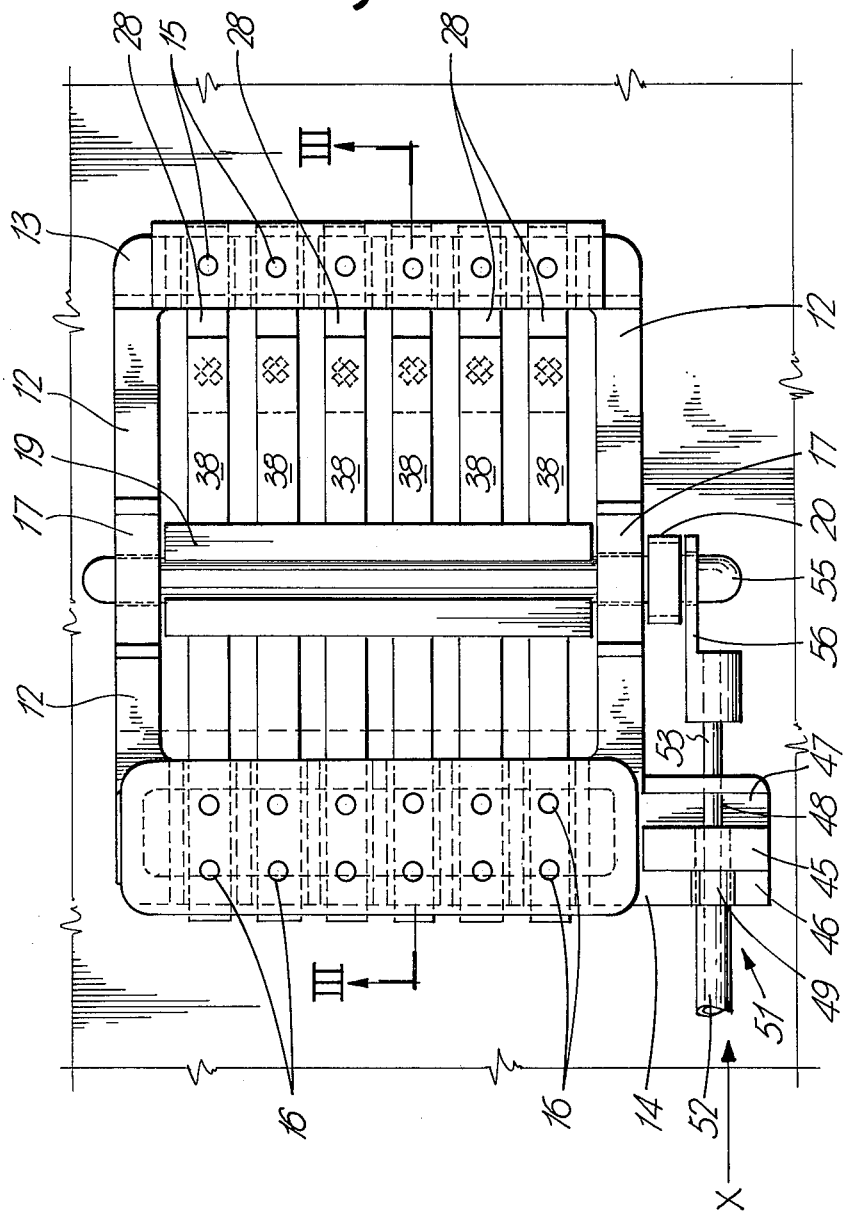

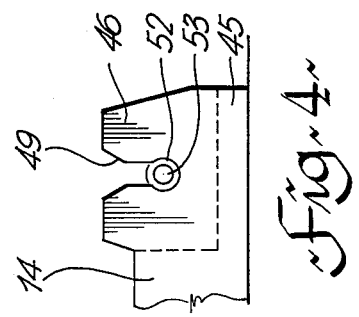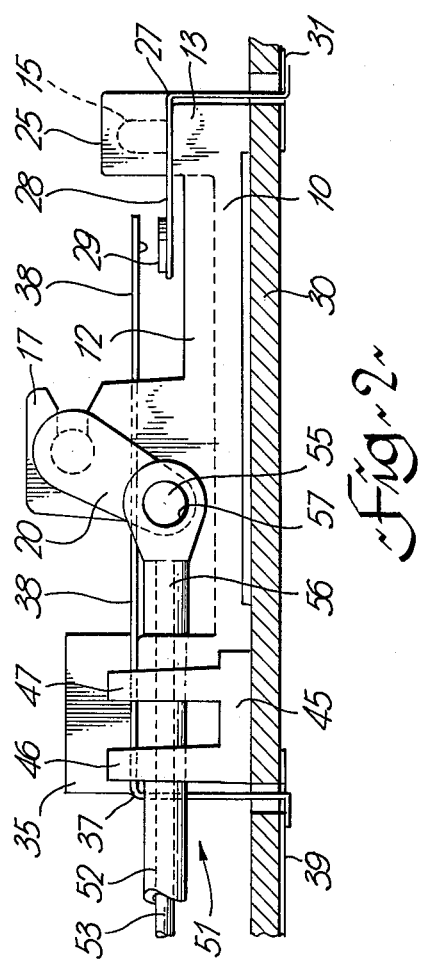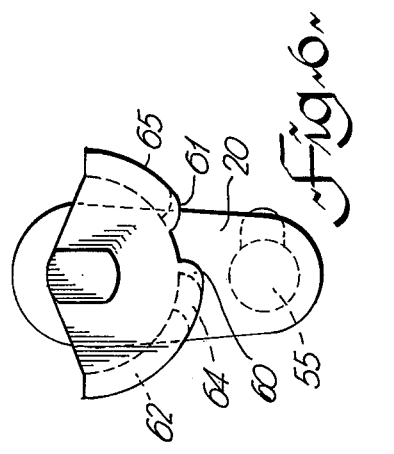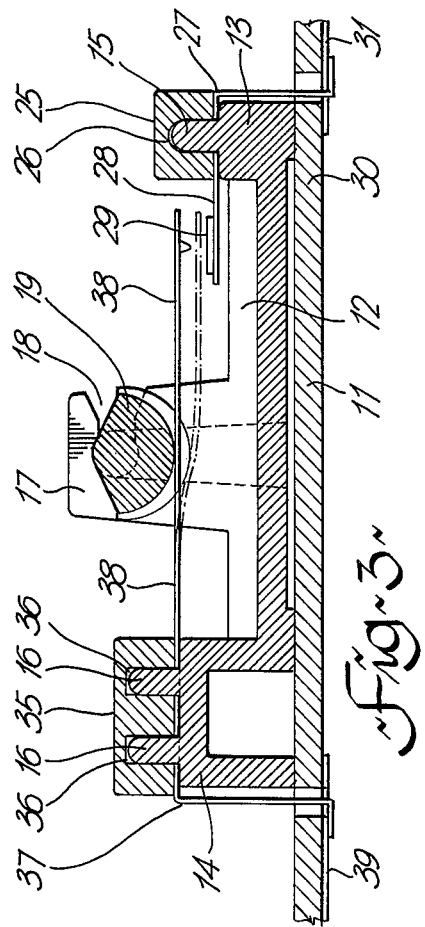

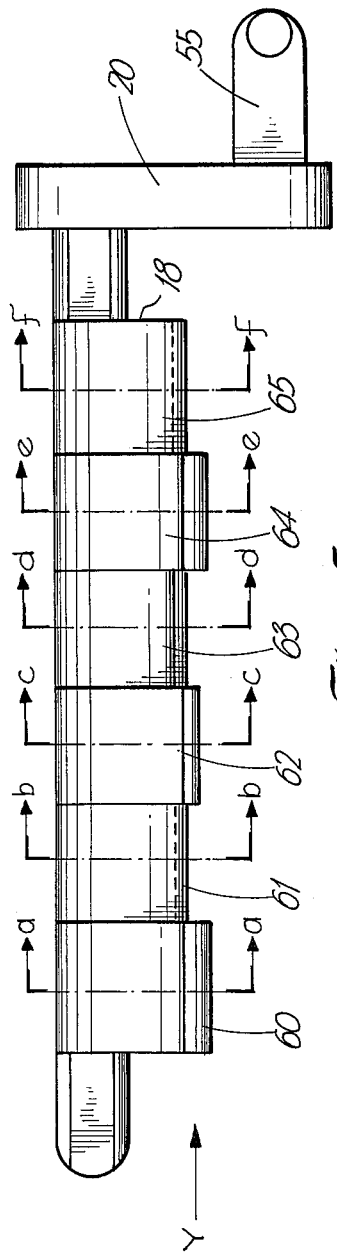
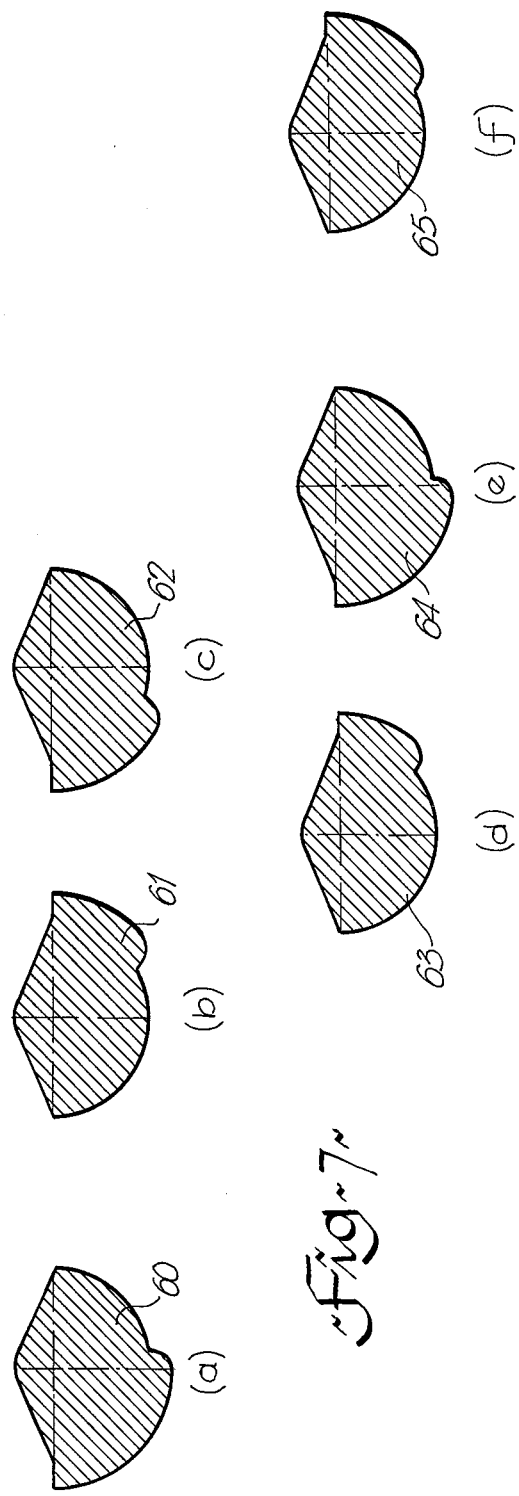
Fig-5
Fig-7

MULTIPLE CONTACT SWITCH

This invention relates to a multiple contact switch and in particular to such a switch with cantilevered spring contact members.

Multiple contact switches are used in many places. In particular such switches are used in telephones and other telecommunication apparatus. One example is used in conjunction with pushbutton dials. Each pushbutton actuates a unique set of contacts, or an unique series of contacts, for generation of a tone signal for example. At the same time all the pushbuttons actuate a further switch, generally referred to as a common switch. Conventionally such common switches comprise a stack of spring contacts with a common plane of actuation. A distinct sequence of makes and breaks between adjacent contact must occur and in spite of careful and accurate manufacture, and assembly, it is often necessary to apply some post-assembly adjustment to the contacts. This is delicate and time consuming.

Another switch using a stack of spring contacts is the hook switch of a telephone. Here again a particular sequence of makes and breaks is necessary, thus requiring post-assembly adjustment.

The present invention provides a switch having a plurality of contact members in which post-assembly adjustment is not required as each contact is individually actuated, in the desired sequence. The contacts are actuated by a rotary cam member and a feature of the invention is that the assembled switch can be positioned at any convenient position and remotely actuated. Thus, for example, instead of the hook switch being mounted in the telephone set immediately adjacent to the member against which the handset rests, with movement of the member actuating the hook switch directly, the member can be caused to act on an intervening member such as a flexible cable, which in turn actuates the switch. This provides for increased freedom of design of a telephone set, with the ability to mount a switch in a less critical position.

Figure 9:
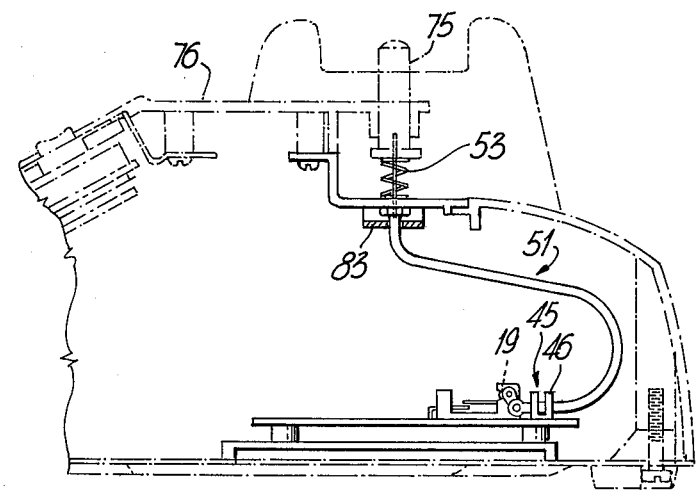

The invention will be readily understood by the following description of a switch in conjunction with the accompanying drawings, in which:

FIG. 1 is a plan view of one form of switch;
FIG. 2 is a side view of the switch of FIG. 1;
FIG. 3 is a cross-section on the line III—III of FIG. 1;
FIG. 4 is an end view of a cable anchorage, viewed in the direction of arrow X in FIG. 1;
FIG. 5 is a side view of a cam member for the switch of FIGS. 1 to 4;
FIG. 6 is a view in the direction of arrow Y in FIG. 5;
FIG. 7 is a series of cross-sections on the lines A to E of FIG. 5, showing typical cam forms;
FIG. 8 is a cross-section through a telephone set embodying one form of remote actuation;
FIG. 9 is a cross-section similar to that of FIG. 8, illustrating an alternative form of remote actuation.

As seen in FIGS. 1, 2 and 3, a switch comprises a main member 10 having a central flat portion 11, raised side members 12, a rib 13 at one end and a larger rib 14, having a channel shaped cross-section at the other end. The channel shaped cross-section of the rib 14 is not essential to the invention, but reduces the amount of material. A single row of protuberances 15 extends along the top of the rib 13 and a double row of protuberances 16 extends along the top of the rib 14, the protuberances aligned in pairs.

At a position along each side member 12, approximately at mid-position, is an upstanding bracket 17. Each bracket 17 has a lateral slot 18 near the top, in the present example being slots 18 being open-ended towards the rib 13. Journalled in the slots 18 is a rotary cam member 19. At one end of the cam member 19 is attached a lever 20, by which the cam member can be rotatably reciprocated back and forth.

A cap 25 rests on the top of the rib 13. The cap has a series of holes 26 aligned with protuberances 15. A spring contact 27 fits over each protuberance 15 and the cap 25 holds the spring contacts 27 in place. Each spring contact 27 has a short cantilevered portion 28 extending toward the cam member 18 with a contact 29 attached at the end. Each spring contact extends down the outer surface of the rib 13 and, as illustrated, passes through a printed circuit board 30 and soldered to a circuit indicated at 31.

In a similar manner a cap 35 rests on the top of rib 14, the cap having holes 36 aligned with the protuberances 16. A spring contact 37 fits over each pair of protuberances 16, each contact 37 having an extended cantilevered portion 38 which overlaps the end of a related spring contact 27. The cantilevered portions 38 pass below the cam member 18 and one acted upon by cam surfaces on the cam member, as will be described. Each spring contact 37 extends down the outer surface of the rib 14 and through the printed circuit board 30, being soldered to a circuit 39.

In the example illustrated, the spring contacts 27 and 37 have holes formed therein for fitting over the protuberances 15 and 16, to give correct positioning. Other forms of location can be used. The caps 25 and 35 can be attached in various ways. For example the caps can be bonded to the ribs by a suitable adhesive or by welding. Instead of the spring contacts extending down through the printed circuit board 30, they can extend laterally for attachment by other means to a circuit member or part.

When the spring contacts extend down through a printed circuit board, or similar member, the switch assembly can be attached to the board or other member by means of the contacts. Alternatively, or in addition, the switch assembly can be attached by screws, rivets or interengaging formations on the main member and board or other member.

The cam can be rotated by a member engaging with the lever 20. This can be a sliding member, such as is used on conventional pushbutton dials. When used as a common switch such sliding member is actuated by the shafts selectively actuated by the pushbuttons. An example of this is described in copending application Ser. No. 688,381, filed May 26, 1976, or Ser. No. 252,722, filed May 17, 1976, now U.S. Pat. No. 4,049,924, in the name of the present assignee.

In other circumstances it may be desired that the switch be positioned away from where direct actuation is possible and some form of remote actuation can be provided. This is illustrated in FIGS. 1 to 4. An extension 45 is provided at one end of the rib 14, the extension being on the same side as is the lever 20 on the end of the cam member 18. The extension 45 is bifurcated to provide two spaced apart legs 46 and 47. The leg 47 nearest the cam member has a narrow slot 48 therethrough and leg 46 has a wider slot 49 therethrough and aligned with slot 48. The slots extend down from top surfaces 50 of the legs 46 and 47. One end of a flexible cable 51 is positioned in the extension 45, the outer casing 52 being a tight fit in slot 49 and the inner cable 53 passing through the slot 48. The end of the casing 52 abuts against the leg 47. The bottom of the slot 49 can be shaped to grip the casing after forcing down the slot, as seen in FIG. 4.

The end of the lever 20 on the cam member 18 is provided with a boss 55. A leg 56 is crimped onto the end of the inner cable 53, the leg having a hole 57 which engages over the boss 55. The other end of the cable 51 is attached to the member, movement of which is required to actuate the switch. Thus, for example, for a hook switch, a member which is moved, as by being depressed or rotated, on replacement of the hand set, actuates the cable which in turn actuates the switch.

FIG. 5 is a side view of the cam member, with a typical plurality of cam forms being shown in FIG. 7. The relative angular disposition of the cams is seen in FIG. 6. The cams, 60, 61, 62, 63, 64 and 65 act on the spring contacts 18. The spring contacts 18 are biased upwardly away from the contacts 29 and the cams press the spring contacts 18 down. At any particular position of the cam member 18 one or more spring contact members 38 are pushed down in contact with contacts 29, while others are not in contact. The particular sequence of makes and breaks, and the initial and final conditions at one end or the other of the rotational movement of the cam member, and the amount of overlaps of contact condition, are provided by the particular forms of the various cams.

FIGS. 8 and 9 illustrates two applications of the invention, in the present instance to the hook, or line, switch of a telephone.

The conventional buttons 75 of a telephone set 76 are depressed when the handset, not shown, is replaced. Normally such depression acts on a switch composed of a plurality of stacked spring contacts.

In the arrangement of FIG. 8, a bell crank lever 77 is pivotally mounted at 78, one leg 79 of the lever extending beneath the buttons 75. The other leg 80 attached at its end 81 to the end of the inner cable 53 of flexible cable 51. The outer casing 52 is fastened at each end; in a support bracket 84 at one end and in the leg 46 of the extension 45 at the other end. Depression of a button 75 pivots the lever 77 which in turn pulls on the inner cable 53. This actuates the cam 19.

FIG. 9 illustrates an alternative arrangement in which a button pushes directly on the inner cable 53. One end of the outer casing of the cable is held in clamping member 83 mounted on the casing of the telephone set 76 and the other end is in the leg 46 of the extension 45. In this arrangement, depression of a button pushes cable 53 instead of pulling and appropriate formation of the cam member 19 is necessary. The relative dispositions of the cams 60 to 65, as in FIGS. 5, 6 and 7, will depend upon the direction of rotation of the cam 19, which in turn may be influenced by the particular way it is actuated, for example by pulling or pushing by the flexible cable.

Similar forms of remote actuation of the cam member for purposes other than a hook, or line, switch can be provided.

The switch is simple, easy to assemble and does not require any post-assembly adjustment of the spring contact members.

What is claimed is:

1. A multi-contact switch for a telephone set, comprising:
    a base member mounted on one part of said telephone set;
    a plurality of contact areas on said base member, spaced across said base member;
    a plurality of elongate cantilever spring contact members extending side-by-side over said base member, a contact member related to each contact area;
    a contact portion on each contact member, the contact portion over the related contact area, the contact members resiliently biased away from said base member;
    a rotary cam member mounted over said spring contact members, the rotary axis of the cam member extending normal to the longitudinal axes of the spring contact members;
    cam surfaces on said rotary cam member, a cam surface for each spring contact member;
    an arm extending radially at one end of said cam member;
    a remote actuating member mounted on said telephone set at a position remote from said base member;
    means for connecting said arm to said remote actuating member.

2. A switch as claimed in claim 1, said means for connecting said arm to a remote actuating member comprising a flexible cable, one end of said cable connected to said arm and the other end of said cable including means for connecting to said remote actuating member.

3. A switch as claimed in claim 2, said flexible cable comprising an inner cable and an outer flexible casing, including attachment means on said base member for attachment of said casing at said one end of said cable, said inner member extending through said attachment means to said arm;
    further attachment means at said other end of said cable for attachment of said other end of said casing, said inner member extending through said further attachment means to said remote actuating member.

4. A switch as claimed in claim 3, comprising a line switch for a telephone set, said base member mounted on a base part of the telephone set and said further attachment means mounted on said telephone set housing adjacent to an actuating member moved by removal and replacement of a handset on the telephone set.

5. A switch as claimed in claim 3, said switch a line switch in a telephone set having a base and a top housing, said base member of said switch mounted on said base of the telephone set, said top housing including means depressed by replacement of a handset on the top housing and forming said remote actuating member, said further attachment means mounted on said top housing and said inner member of said cable connected to said means depressed by the hand set, whereby said cam member is rotated by pushing of said inner member of the cable.

6. A switch as claimed in claim 3, said switch a line switch in a telephone set having a base and a top housing, said base member of said switch mounted on said base of the telephone set, said top housing including means depressed by replacement of a handset on the top housing and forming said remote actuating member, mounting means extending from said base toward said top housing, means pivotally mounting a lever in said telephone set, one end of said lever in cooperation with said means depressed by the handset and the other end of said lever connected to the inner member of said cable.

7. A switch as claimed in claim 6, said lever a bell-crank lever, a bracket on said base extending toward said top housing, said bell crank lever pivotally mounted on said bracket, whereby said cam member is rotated by pulling of said inner member of the cable.

* * * * *